Aug. 24, 1965     A. H. POST, JR., ETAL     3,201,947
CRYOGENIC TRANSPORT TUBE INCORPORATING LIQUEFACTION APPARATUS
Filed Sept. 6, 1963                                 6 Sheets-Sheet 1

Arthur H. Post, Jr.
Milton H. Streeter
*INVENTORS*

BY

Attorney

Arthur H. Post, Jr.
Milton H. Streeter
INVENTORS

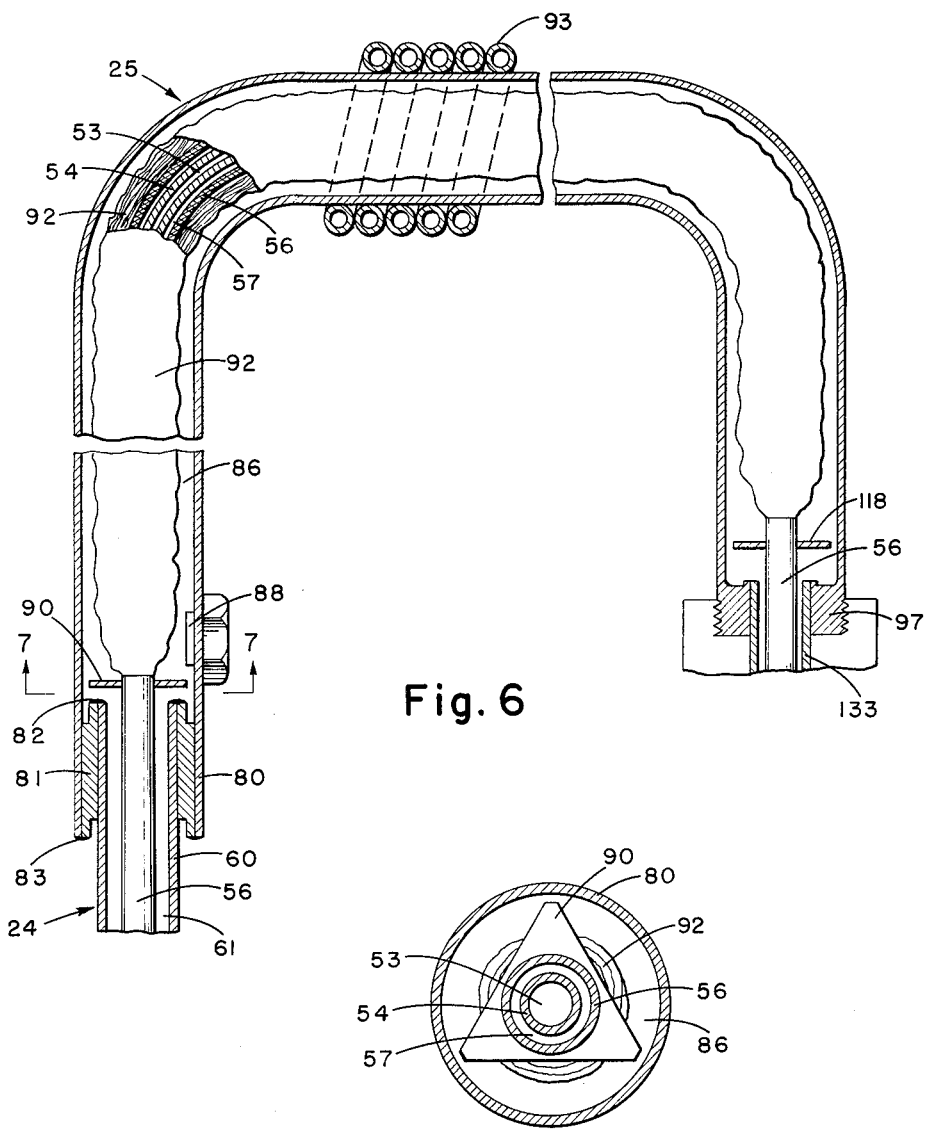

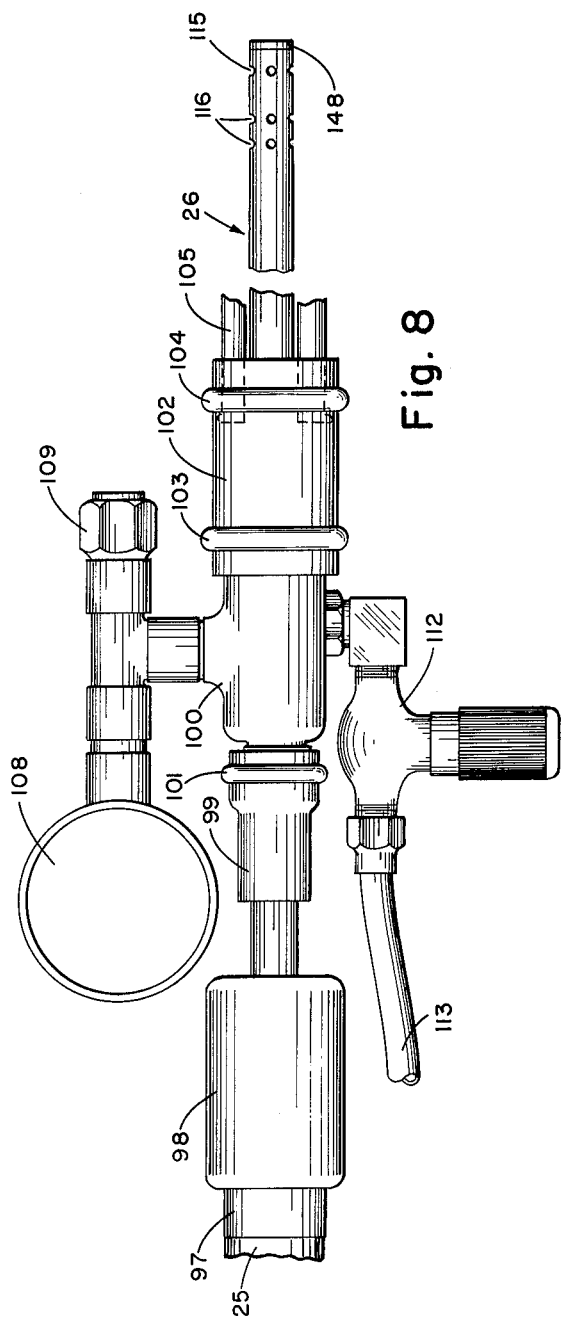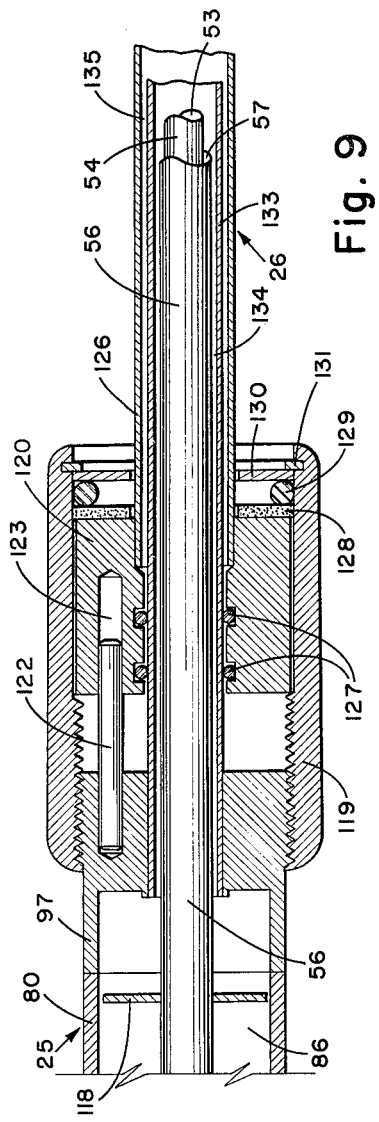

Arthur H. Post, Jr.
Milton H. Streeter
INVENTORS

# United States Patent Office 3,201,947
Patented Aug. 24, 1965

3,201,947
CRYOGENIC TRANSPORT TUBE INCORPORATING LIQUEFACTION APPARATUS
Arthur H. Post, Jr., Belmont, and Milton H. Streeter, Sudbury, Mass., assignors to Arthur D. Little, Inc., Cambridge, Mass., a corporation of Massachusetts
Filed Sept. 6, 1963, Ser. No. 307,073
9 Claims. (Cl. 62—55)

This invention refers to refrigeration apparatus for liquefying gases and more particularly to refrigeration apparatus designed to furnish liquefied helium gas in quantity.

The most universally used apparatus for liquefying helium in quantity is the so-called cryostat described in U.S. Patent 2,458,894. This apparatus comprises, within a Dewar-type vessel housed in an insulated structure, a main heat exchanger, one or more expansion engines, a Joule-Thomson heat exchanger and a Joule-Thomson expansion valve, the latter being the means by which cold high-pressure gas is further cooled, expanded and at least partially liquefied. In the operation of the cryostat the liquid helium is permitted to collect within a receptacle provided for the purpose within the Dewar-type vessel. The cryostat has found widespread use both as an experimental tool and as a source of liquefied helium in quantity.

In the supplying of large quantities of liquefied helium it is of course necessary to remove liquid helium periodically into a storage vessel when a sufficient amount of it has been accumulated in the internal receptacle of the cryostat. Since the capacity of this internal receptacle is somewhat limited (normally about 15 liters) it is necessary for an attendant to periodically withdraw the helium from the cryostat into a vessel, such as a large Dewar. This means that someone must be in substantially continuous attendance. It also means that the drawoff tube must be periodically cooled down, an operation which always causes losses due to boil-off of the liquefied helium in cooling the drawoff tube. With the use of very large Dewars (for example, those of 200-liter capacity) it becomes apparent that continuous supervison or attendance during the filling of such a vessel is undesirable, both with respect to manpower requirements as well as to thermodynamic losses brought about by numerous drawoff tube cool downs.

It would therefore be desirable to have apparatus which would permit the continuous liquefaction of gases within the Dewar storage vessel itself, thus eliminating the necessity for periodically withdrawing the liquefied gas from within the cryostat for transfer into the storage vessel. This would eliminate continuous supervision in the production of large quantities of helium and would also eliminate periodic cool downs of the drawoff tube.

It is therefore an object of this invention to provide an apparatus which permits the actual liquefaction of a gas within the vessel in which it is to be stored. It is another object of this invention to provide a modification of the present helium liquefaction apparatus, which eliminates substantially continuous personal attendance, thus making it readily adaptable to large scale productions of liquefied gases, particularly liquefied helium. It is yet another object of this invention to provide apparatus of the character described which sustains smaller thermodynamic losses than if the liquefied gas were transferred periodically from the liquefaction apparatus to the storage vessel. It is yet another object of this invention to provide apparatus of the character described, which makes it possible to fill a storage vessel with liquefied gas to its maximum capacity. It is still another object of this invention to provide external liquefaction equipment which is flexible in its application to various sizes of storage vessels and to various locations of the vessel with respect to the cryostat. Other objects of the invention will in part be obvious and will in part be apparent hereinafter.

The invention accordingly comprises the features of construction, combination of elements, and arrangement of parts which will be exemplified in the constructions hereinafter set forth, and the scope of the invention will be indicated in the claims.

The apparatus of this invention makes it possible to liquefy gases within the storage vessel rather than within the liquefaction apparatus itself by the use of an insulated, flexible transfer device, capable of achieving heat transfer and having a controllable Joule-Thomson expansion valve at that end which is adapted to be inserted into a storage vessel and to liquefy gas within the storage vessel, thereby delivering a continuous stream of liquefied gas into the storage vessel.

For a fuller understanding of the nature and objects of the invention, reference should be had to the following detailed description taken in connection with the accompanying drawings in which FIG. 1 is an elevational view, partly in cutaway section, of a cryostat and Dewar, showing the transfer device in its two extreme positions;

FIG. 6 is a longitudinal cross-section of the external section of the transfer tube and its coupling to the first internal rigid section;

FIG. 7 is a cross-section along line 7—7 of FIG. 6;

FIG. 8 is a side elevational view of the pressure hat and its attendant coupling devices which join the external section to the second rigid internal section;

FIG. 9 is a cross-section along line 9—9 of FIG. 8;

Figure 1:
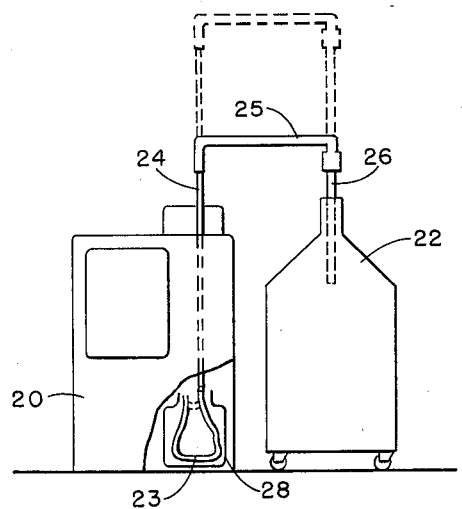

FIG. 1 shows the relationship among the cryostat in which high-pressure gas (e.g., helium) is cooled, the transfer tube, and the storage vessel in which the cooled high-pressure gas is at least partially liquefied. For convenience of description, the transfer tube of this invention is divided into four sections referred to as the internal flexible section 23 which is located within the liquefaction vessel 28 of the cryostat 20; the first internal rigid section 24 which during operation is substantially all within the cryostat; the external rigid section 25 and the second internal rigid section 26 which contains a Joule-Thomson valve at its end and is during operation substantially all within the storage vessel 22 wherein liquefaction takes place. Associated with these sections are suitable coupling, controlling, and insulation means as will be described later. The flexible section 23 permits the remaining portions of the transfer tube to be raised and lowered, the extreme retracted position shown by dotted lines in FIG. 1, the operating or liquefying position shown in solid lines in FIG. 1. Thus, this degree of flexibility makes it possible to raise and lower the transfer tube in such a fashion that it may be withdrawn or inserted into a storage vessel without raising the storage vessel. This is particularly important where the storage vessel is of such a size that it would be difficult to raise it up. Moreover the internal flexible tubing makes it possible to rotate the drawoff arm through 180° thus making it feasible to locate the storage vessel 22 in a number of desired positions with relationship to the cryostat 20.

In the following description it will be assumed that helium is to be liquefied. However, the apparatus of this invention is equally suitable for liquefying other cryogenic gases, e.g., hydrogen.

Figure 3:
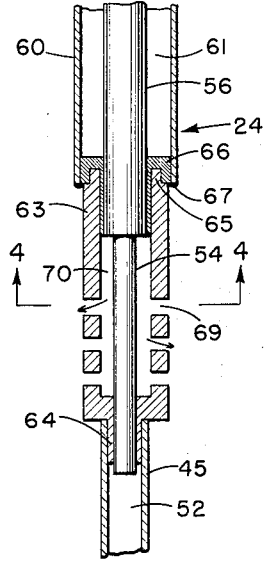
FIG. 3 is a detail of the coupling of the flexible transfer tube within the cryostat to a first internal rigid section.
Figure 4:
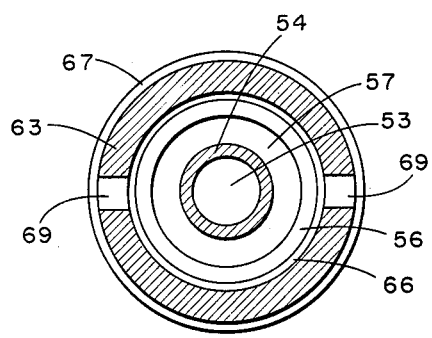
FIG. 4 is a cross-section along lines 4—4 of FIG. 3.
Figure 2:
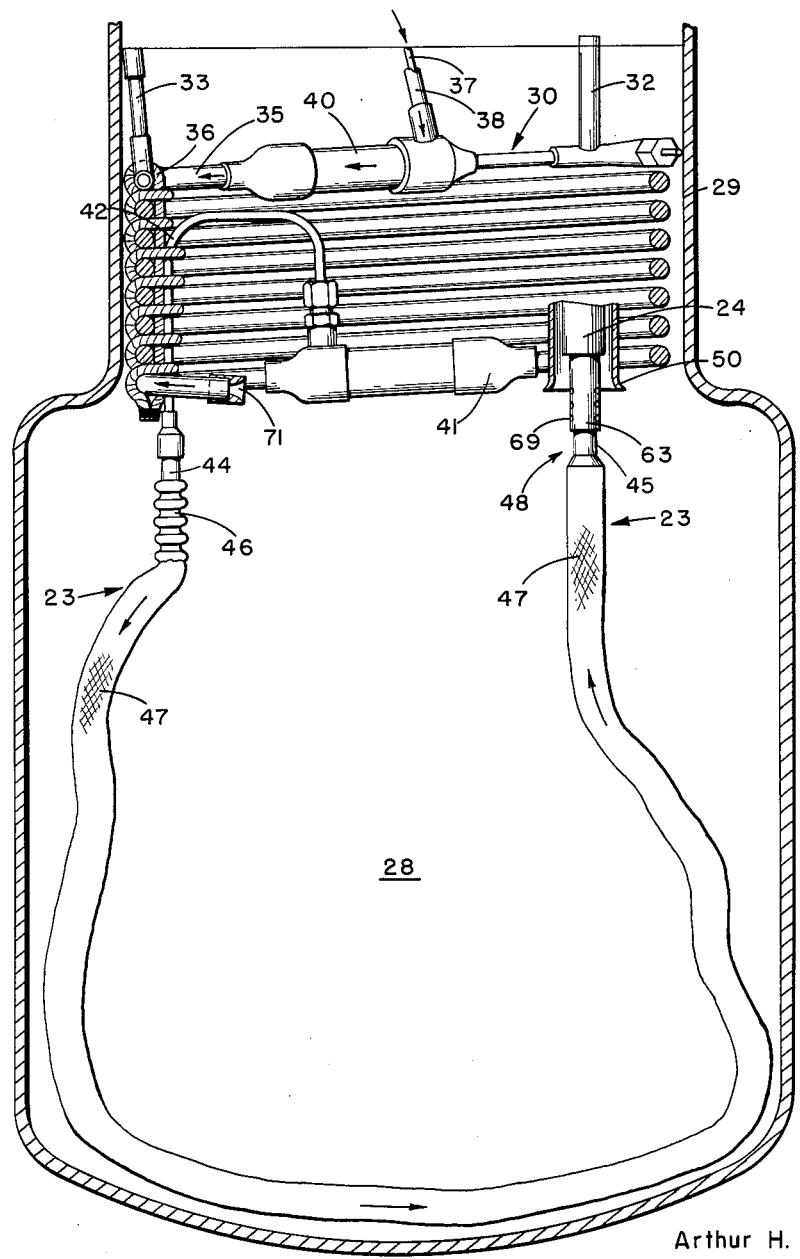
FIG. 2 is a cross-section of a portion of the interior of a cryostat showing the attachment of the Joule-Thomson heat exchanger to the flexible portion of the transfer tube within the cryostat.

The manner in which the internal flexible section of the transfer tube of this invention is coupled to the heat exchange system within the cryostat and to the first rigid internal section 24 is shown in FIGS. 2–4. Within the receptacle 28 which is in the bottom portion of the cryostat and which is thoroughly insulated, there is provided a Joule-Thomson heat exchanger, generally designated by numeral 30. This heat exchanger is held within the system by supports 32 and 33. Inasmuch as the remaining portion of the heat exchange system, the expansion engines, the charcoal traps and associated equipment are not part of this invention they are not shown in a drawing.

The Joule-Thomson heat exchanger 30 is formed of tubing 35 which is spaced and packed with a packing separator 36. The tubing is standard heat exchange tubing in which the annular channel 38 is adapted to transfer cold high-pressure gas to an expansion means while the central channel 37 carries low-pressure cold gas which is being circulated in a direction countercurrent to the flow of high-pressure gas for out-of-contact heat exchange and further cooling of the high-pressure gas. The high-pressure gas which is delivered from the bottom end of the main heat exchanger (not shown) into the Joule-Thomson heat exchanger 30 has been initially cooled.

Two glass wool filters 40 and 41 are provided to remove any residual charcoal particles which may have entered the gas stream in the charcoal traps above that portion of the apparatus illustrated in FIG. 2. Subsequent to its discharge from glass wool filter 41, the high-pressure cold gas is transferred by way of conduit 42 into the internal flexible tubing section 23 located within receptacle 28. This portion of the transfer tube is connected by means of neck 44 to a corrugated stainless steel tubing 46 which in turn is wound with wire braid 47 to give it physical resistance and protection. The corrugated tubing 46 is sufficiently flexible so that it may be moved around within the receptacle 28 and extended to raise the transfer tube into its upper retracted position as shown in the dotted lines in FIG. 1. Stainless steel at the temperatures involved does not exhibit brittleness and is therefore suitable for this flexible section of the tube. At the other end the flexible section 23 is joined to the first rigid internal section 24 of the tube through a suitable coupling 48 which is shown in detail in FIG. 3. There is provided a protection sheath 50 which extends up through the cryostat and thus furnishes a path for the tube section 24 through the packing which extends through essentially the entire cryostat.

The coupling which joins the flexible section 23 and the first internal section 24, which moves up and down through the cryostat, is shown in detail in FIG. 3. It is not only necessary to join these two tube sections but to do it in such a manner as to provide sufficient structural support to the small high-pressure tubing (characteristically about 1/8" in diameter) as well as to provide means for introducing the cold low-pressure return gas into the cryostat system and to furnish a vacuum space (described below) which must be an integral part of the insulation system of the entire transfer tube.

The transfer tube must be capable of transferring cold high-pressure gas to the Joule-Thomson valve at its end as well as returning that portion of cold low-pressure gas which did not liquefy to the cryostat. The returning low-pressure gas is used to further cool the high-pressure gas prior to expansion which means that the transfer tube must serve as an out-of-contact heat exchanger. This in turn requires an efficient insulation system.

The collar 45 of the flexible tubing which is joined to the first internal tube section has within it a channel 52 (FIG. 3) which conducts the high-pressure gas into a channel 53 which is to run throughout the entire transfer tube. This latter channel is defined by a tubing 54 around which is a second concentric tubing 56. Between tubing 56 and 54 there is defined an annular channel 57 (see FIG. 4) through which the low-pressure gas is returned to the cryostat as indicated by the arrows showing the flow. Around the tubing 54 and 56 is placed a second concentric tubing 60 which serves as the outer wall of the first internal section 24 of the transfer tube. Tubing 56 and 60 define between them an annular space 61 which is evacuated for purposes of insulation. The manner in which this evacuation is achieved will be described later in conjunction with FIG. 6. Tube section 24 and collar 45 of flexible tubing 23 are coupled through a joining member 63 which at the bottom end has a neck 64 adapted to fit into and be sealed to the end of collar 45. At the other end is a shoulder section 65 which fits into a fitting piece 66, the latter being welded at 67 onto the end of the outer tubing wall 60, forming the final coupling to tube section 24.

The joining member 63 has a series of ports 69 which permit the low-pressure gas returning through channel 57 to flow out of space 70 into the helium receptacle 28. From this receptacle 28 the low-pressure return gas is directed into return fitting 71 and thus recycled through the Joule-Thomson heat exchanger for heat exchange with the incoming high-pressure gas which is to be liquefied.

In the operation of the transfer tube of this invention to liquefy gases directly in the storage vessel, it has been found that there is some slight pressure build-up within the storage vessel, and that when this pressure is equilibrated there is some loss of liquid volume accumulated. The build-up is apparently due to a small pressure drop through the return low-pressure side of the transfer tube as well as an increase in the pressure drop in the Joule-Thomson heat exchanger inasmuch as the low-pressure gas enters it at a somewhat higher temperature than would be normal if liquefaction took place within the cryostat itself. For example, in the process of equilibrating the pressure within the storage Dewar, the temperature of the liquefied helium drops from about 4.6 to about 4.2° K. thus increasing the density and decreasing the volume of the stored liquid helium. This causes some loss in liquid volume. The remaining loss is due to the fact that in achieving the equilibration necessary in the storage vessel from 8 to about 4 p.s.i.g., some boil-off of the liquid occurs in cooling from 4.6 to 4.2° K.

Figure 5:
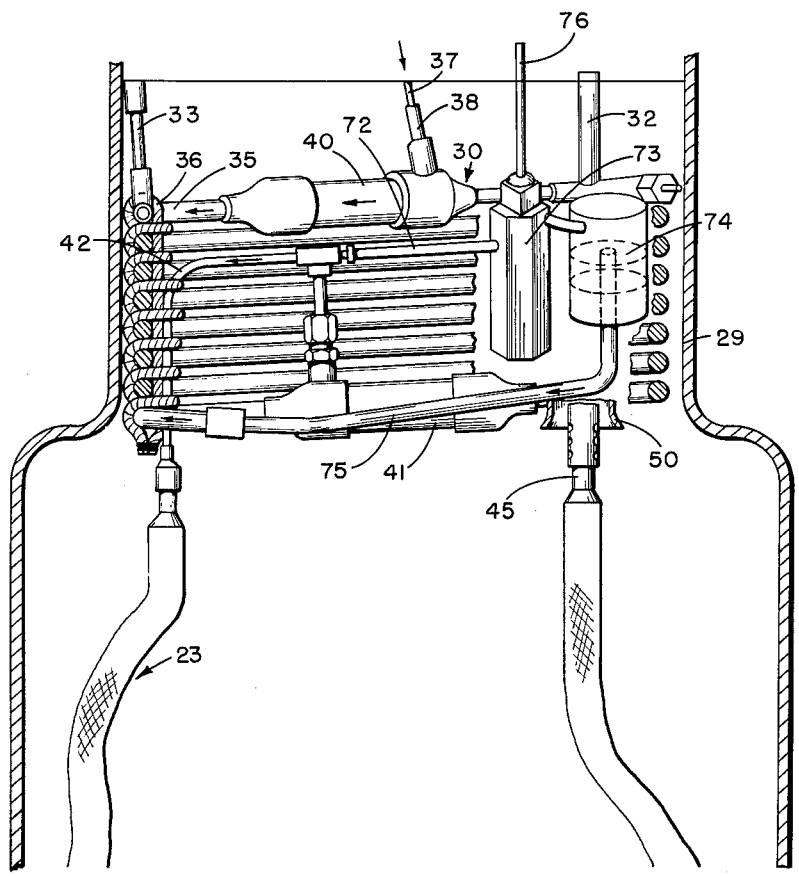
FIG. 5 is a modification of FIG. 2 showing the incorporation of an internal Joule-Thomson valve and an associated diffuser.

In commercial operations where it is desirable to fill a storage Dewar to its maximum capacity, it may be advisable or desirable to be able to liquefy helium within the cryostat itself and to transfer a last portion of liquid helium from the cryostat to the storage vessel, thus making up any loss which has occurred in liquefying within the storage vessel. This is conveniently done by supplying within the cryostat a standard Joule-Thomson expansion valve along with a suitable diffuser such as now provided within the cryostat. Thus the apparatus of FIG. 5 shows the incorporation of a second internal Joule-Thomson expansion valve which can be actuated after the Joule-Thomson valve within the Dewar has been turned off. It will be appreciated that both of the Joule-Thomson valves cannot be operated simultaneously and that the internal Joule-Thomson valve must not be operated until the external Joule-Thomson valve within the Dewar has supplied all of the liquid helium which it is capable of supplying into the Dewar and the Dewar has been brought into equilibrium conditions, thus making it ready to receive a topping quantity of liquid helium.

In FIG. 5 the high-pressure tubing 72 will be seen to lead to an internal Joule-Thomson valve 73 controlled by valve stem 76, and from the Joule-Thomson valve to the diffuser 74 which in turn separates liquefied gas from cold low-pressure gas and returns the low-pressure gas through conduit 75 into Joule-Thomson heat exchanger 30, such as is done in the case of the apparatus of FIG. 2. In this modification all low-pressure gas returns through diffuser 74.

The external section 25 of the transfer tube which is subjected to atmospheric conditions during operation must of course be thoroughly insulated and protected against heat transfer leaks. The external section 25 of the tubing and its connection with the first internal section 24, which can move up and down within the cryostat, are shown in FIG. 6 wherein like numbers refer to like components of the apparatus. This external section of the transfer tube comprises an outer sheath 80 and an adapter 81 which joins it to the first internal tubing section 24. This is accomplished by welding the tubing at the points of contact with the adapter, such as at 82 or 83. Within sheath 80 is an annular evacuated channel 86 which is continuous and integral with the evacuated channel 61 (see FIG. 3) of the first internal tubing section. A threaded opening 88 is provided for attaching a vacuum valve and a vacuum line leading to a vacuum pump not shown. After evacuation has been completed the opening is sealed by suitable means and further evacuation is not necessary, unless the vacuum within the system is lost. Just above the point at which sheath 80 joins to tube section 24, a spacer such as shown in FIG. 7 is placed to hold the high-pressure and low-pressure tubings 54 and 56 in place. It is of course desirable to use a spacer which makes a minimum number of contacts with the outside wall of sheath 80 and this is achieved through the triangular spacer 90 which is so designed that it barely touches the wall.

Around the tubing contained within sheath 80 is wrapped suitable radiation shielding 92. This shielding may be of any suitable design and is characteristically spaced aluminum foil wrapped around the tubing in a manner such that the foil surfaces are separated.

As an additional method of minimizing heat leak to the atmosphere it may be desirable to wrap the outside of the sheath 80 with coils 93 which are suitable for conducting liquid nitrogen therethrough. These liquid nitrogen coils then serve as cooling coils to further reduce the heat leak to the gases being transferred within the transfer tube from the atmosphere.

It is also necessary to provide suitable coupling means between external tubing section 25 and the second internal tubing section 26 which is to be inserted into the Dewar and which is to contain the Joule-Thomson expansion valve at its end. This coupling is accomplished by means of the apparatus illustrated in FIGS. 8 and 9. FIG. 8 is a side elevational view of the coupling showing pressure controlling apparatus and the means by which the Joule-Thomson valve is operated. Tubing section 25 by means of the base piece 97 is attached to a barrel which is shown in detail in FIG. 9. This barrel in turn makes the connections between tubing sections 25 and 26, the latter being attached by means of a rubber seal to a heat exchanger T and held in position through a hose clamp 101. A second rubber seal 102 and hose clamps 103 and 104 are used to attach the transfer tube and furnish a seal with the neck of the Dewar shown partially as 105. There is also attached to the heat exchanger T a pressure gage 108 and relief valve 109. On the other side of the heat exchanger T is placed a manual cut-off valve 112 which leads to a conduit 113 capable of carrying low-pressure cold gas to a helium recovery system or to a compressor.

The ability to conduct some of the cold low-pressure gas before liquefaction has begun to the helium recovery system or to a compressor has been found to be particularly important in conjunction with the apparatus of this invention. When cold high-pressure helium is first introduced into a Dewar, even though the Dewar has been cooled with liquid nitrogen, it is not down to a temperature below the inversion temperature of helium; thus at temperatures above about 30°K., expansion will not cool and liquefy the helium and hence there is present in the Dewar in the beginning of a cycle some relatively warm, i.e., above 20° K., helium gas which if it were returned to the system would not succeed in sufficiently cooling the incoming high-pressure gas for future expansion and liquefaction. Thus at the beginning of the cycle it is necessary to be able to direct the cold low-pressure gas to a point outside the cryostat (to the recovery system or to a compressor) until the temperature of the incoming high-pressure gas has dropped below about 20°K. When it has reached this temperature then the manual cut-off valve 112 is closed and the high-pressure helium is permitted to expand and liquefy. It is then no longer necessary to return any of the cold low-pressure gas to a point outside the cryostat-storage vessel system.

Tube section 26 terminates with ports 115 which are designed to discharge expanded cold helium gas and liquefied helium into the Dewar and ports 116 which are designed to return the cold low-pressure gas through tubing 26 for return into the cryostat. The Joule-Thomson end section of tubing 26 is shown in detail in FIG. 10 and will be discussed below.

The barrel 98 is shown in detail in FIG. 9. This is the apparatus which makes it possible to control the operation of the Joule-Thomson valve at the end of the tubing section 26 which is within the storage Dewar. In order to keep the channels within the tube which carry the low-pressure and high-pressure fluids in proper alignment, there is provided within the evacuated area 86 at the terminal end of tubing section 25, a spacer 118 which is similar to spacer 90 (FIG. 7). At its end tubing section 25 is joined to a base piece 97 which is threaded to be joined to the barrel body 119. Located within the barrel and at the other end is a plug 120. From the drawing it will be seen in FIG. 9 that by turning the barrel it can be made to translate with respect to the base 97. The plug 120 also translates, but is prevented from rotating by the use of a pin 122 which fits into a recess 123 in the plug 120. The outermost tube of the draw-off tubing 26 is a sheath 126, which is soldered to the plug 120 so that when the plug moves, it moves the sheath back and forth. As will become apparent in the description of FIG. 10, it is through the movement of this sheath that the Joule-Thomson valve operation is controlled.

O-ring seals 127 are provided to seal the space between the sheath and the vacuum space 134 which is an extension of the vacuum space 86 of tubing section 25. The O-ring seals allow the plug to move axially with respect to the vacuum case. Within the barrel there are also provided a nylon washer 128 which is designed to reduce friction, a large O-ring 129 for cushioning the movement of the needle of the Joule-Thomson valve, a washer 130 designed to restrain the O-ring, and a restraining ring 131. In order to define the evacuated space 134 within the tubing 126 it is necessary to provide an additional tubing wall 133 which surrounds and is concentric with the low-pressure and high-pressure fluid channels described above in connection with FIG. 3.

Figure 10:
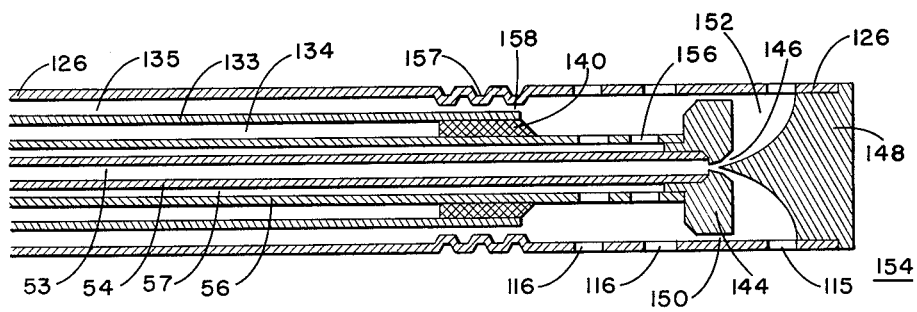
FIG. 10 is a cross-section of the end of the second rigid internal section showing the Joule-Thomson valve.

The tubing 26 which is inserted into the Dewar, ends with the Joule-Thomson valve as shown in cross section detail of FIG. 10, wherein like components are given like numbers. In order to seal the vacuum space which has surrounded the channels containing the high-pressure and low-pressure fluids from the time that they emerged from the flexible tubing section of FIG. 2, it is necessary to provide a plug 140 which closes this evacuated space. Tubing 56 which defines the low-pressure annular channel outside of high-pressure channel 54, ends in an adapter plug 144. The high-pressure channel 54 extends to plug 144, the latter containing a Joule-Thomson valve seat 146.

Sealing the end of sheath 126 is a Joule-Thomson valve stem 148. (The drawing of FIG. 10 is actually drawn with the valve stem 148 further removed from the valve seat 146 than would normally ever be the case.) Between the adapter plug 144 and the internal wall of the sheath 126 is a very small passageway 150 which permits the flow of some of the cold, expanded low-pressure gas back up through ports 156 into the low-pressure channel 57. The major portion of the expanded cold gas and partially liquefied gas will flow into space 152 and thence out of ports 115. The liquid will drop by gravity into the Dewar volume (indicated by numeral 154) while the cold, expanded low-pressure gas will return by way of ports 116 and ports 156 to the low-pressure channel 57.

From an examination of FIGS. 9 and 10 it will be seen that annular channel 135 extends from the stem of the Joule-Thomson valve to within the plug 98. This channel is open to the cold, expanded fluid and therefore contains helium gas. Because of the temperature gradient existing in this channel, an oscillating flow pattern of helium can be set up in channel 135 which, because of the natural elasticity of helium, sets up a standing wave in this column. This in turn leads to undesirable liquid helium losses through excess boil-off brought about by these heat leaks which are maintained by the existence of a standing wave. In order to prevent the formation of such a standing wave, constrictions 157 are placed in the sheath 126 where it surrounds the plug 140, thereby defining between sheath 126 and tubing wall 133 very narrow passageways 158 which restrict the flow of cold gas from space 152 back up through channel 135.

Figure 11:
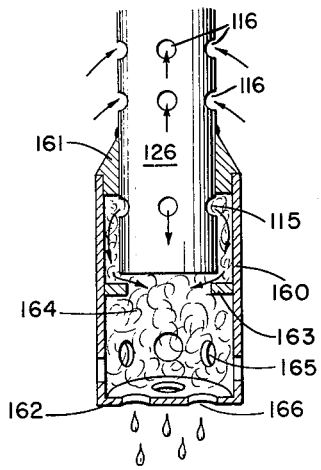
FIG. 11 is a modification of a portion of the apparatus of FIG. 10.

FIG. 11 shows a modification of the end of the tube which is inserted into the Dewar. In this modification there is provided a diffuser which is designed to better separate the liquefied gas from the cold low-pressure gas which results after the passage of the high-pressure gas through the Joule-Thomson expansion valve. In the apparatus of FIG. 11, the diffuser is shown at 160 and is attached to the end of the sheath 126 through the use of the plug 161. As will be noted, it is placed above the ports 115, but below the ports 116. It is closed on the bottom with an end plate 162 and in the interior has an annular ring 163 which is designed to effect further expansion. After the partially expanded and cool gas leaves volume 152 (FIG. 10) through ports 115, it enters the interior of the diffuser and passes through the narrow neck defined by the end of the sheath and the annular ring 163. In this passage further expansion and separation take place. The diffuser is stuffed with stainless steel wool 164 and has a series of holes 165 around its bottom end as well as a number of holes 166 in the end plate 162. The liquid helium flows out through these holes to be collected in the storage vessel. Simultaneously, the cold, expanded gas flows upward and re-enters the system through ports 116 to be transferred back through the transfer tube into the low-pressure cold side of the Joule-Thomson heat exchanger located within the cryostat as shown in FIG. 2.

In the operation of the apparatus of this invention, high-pressure, cold helium gas is delivered through high-pressure line 37 into the Joule-Thomson heat exchange and through the glass wool filters into the flexible tubing 23 (see FIG. 2). As it leaves the flexible tubing section 23, it is directed into the high-pressure channel 53 which runs through the tube 24, sections 25 and 26 and finally into the Joule-Thomson expansion valve. During its passage through the transfer tube it is, of course, further cooled by out-of-contact heat exchange with the cold low-pressure gas which is being returned through the transfer tube from the storage Dewar. This cold low-pressure gas is, of course, that gas which is not liquefied in the passage through the Joule-Thomson valve. It also contains that cold low-pressure gas which has boiled off from the liquefied gas stored in the Dewar. The cold low-pressure gas returns through the appropriate channel 57 and enters into the helium pot 28 within the cryostat by means of ports 69. From there it is returned through the Joule-Thomson heat exchange 30 by way of the special return fittings 71 of FIG. 2, or by way of the diffuser 74 of FIG. 5.

From the above description it will be seen that the apparatus in this invention provides an efficient way of liquefying gases external of a cryostat and at the point where the liquid gas is to be stored. Thus the advantages set out in the beginning are attained. Means are also provided for cooling down a new Dewar so that the initial, relatively warm, low-pressure gas is not sent back into the cryostat. Means are also provided by the modification shown in FIG. 5 for topping off the quantity of the liquefied helium in the storage vessel with an additional quantity of liquid helium liquefied within the cryostate itself.

It will thus be seen that the objects set forth above, among those made apparent from the preceding description, are efficiently attained and since some certain changes may be made in the above construction without departing from the scope of the invention, it is intended that all matter contained in the above description and shown in the accompanying drawings shall be interpreted as illustrative and not in a limiting sense.

We claim:

1. A cryogenic transport tube adapted to effect a final out-of-contact heat exchange between high-pressure and low-pressure fluids and to expand and liquefy said high-pressure fluid at a point of delivery remote from preceding out-of-contact heat exchangers located within an enclosed vessel, comprising in combination
   (a) an enclosed vessel;
   (b) out-of-contact heat exchange means located within said enclosed vessel;
   (c) a conduit in communication with the high-pressure side of the terminal of said heat exchange means within said vessel and constructed and arranged to be moved up and down within said enclosed vessel;
   (d) a first section of tubing comprising an inner high-pressure channel, an annular low-pressure channel surrounding said high-pressure channel and an evacuated annular channel surrounding said low-pressure channel;
   (e) first coupling means joining said conduit to said high-pressure channel of said first section of tubing, and constructed and arranged to provide fluid communication between said annular low-pressure channel of said first section of tubing and the interior of said enclosed vessel and to provide sealing means for one end of said evacuated annular channel;
   (f) a second section of tubing comprising a first continuation of said inner high-pressure channel, said annular low-pressure channel and said evacuated channel of said first section of tubing and raidation shielding means around the outer wall defining said low-pressure channel;
   (g) second coupling means joining said first and second sections of tubing in fluid-tight relationship;
   (h) a third section of tubing comprising a second continuation of said inner high-pressure channel, said annular low-pressure channel and said evacuated channel of said first section of tubing and having an outer protective sheath furnishing an outermost channel for low-pressure cold fluid; said third section having a fluid delivery end suitable for insertion in a storage vessel;
   (i) said fluid delivery end comprising
      (1) valve means constructed and arranged to expand and at least partially liquefy high-pressure fluid delivered thereto by said high-pressure channel,
      (2) passage means constructed and arranged to return cold high-pressure gas through said annular low-pressure channel, and (3) sealing means terminating said evacuated annular channel; and
(j) third coupling means joining said second and third sections of tubing in fluid-tight relationship and containing therein means for actuating said valve means located in said delivery end of said third section of tubing.

2. Transport tube in accordance with claim 1 wherein said second section of tubing includes internal spacer means constructed and arranged to maintain said channels and radiation shielding in spaced relationship with the outer wall of said second section of tubing.

3. Transport tube in accordance with claim 1 wherein said second section of tubing has coils thermally bonded to its external wall, said coils being constructed and arranged to circulate a cryogenic cooling fluid therethrough.

4. Transport tube in accordance with claim 1 wherein said fluid delivery end of said third section of tubing is further characterized by having constrictions in said outer protective sheath corresponding in location to said sealing means, whereby the fluid passageway into said outermost channel is sufficiently narrowed to prevent the establishment of a standing wave therein.

5. Transport tube in accordance with claim 1 wherein said fluid delivery end of said third section of tubing has fluid diffusing means constructed and arranged to separate liquid and gas.

6. Transport tube in accordance with claim 1 wherein said third coupling means has a valve constructed and arranged to conduct cold expanded fluid returning through said low-pressure channel to a point outside said enclosed vessel.

7. Refrigeration apparatus adapted to liquefy cryogenic fluids within a storage vessel, comprising in combination
(a) fluid expansion means;
(b) an enclosed vessel having a series of heat exchangers constructed and arranged to effect out-of-contact heat exchange between high-pressure fluid flowing into said fluid expansion means and cold low-pressure fluid returning from said expansion means;
(c) conduit in communication with the high-pressure side of the terminal of said heat exchangers within said vessel and constructed and arranged to be moved up and down within said enclosed vessel;
(d) a first section of tubing comprising an inner high-pressure channel, an annular low-pressure channel surrounding said high-pressure channel and an evacuated annular channel surrounding said low-pressure channel;
(e) first coupling means joining said conduit to said high-pressure channel of said first section of tubing, and constructed and arranged to provide fluid communication between said annular low-pressure channel of said first section of tubing and the interior of said enclosed vessel and to provide sealing means for one end of said evacuated annular channel;
(f) a second section of tubing comprising a first continuation of said inner high-pressure channel, said annular low-pressure channel and said evacuated channel of said first section of tubing and radiation shielding means around the outer wall defining said low-pressure channel;
(g) second coupling means joining said first and second sections of tubing in fluid-tight relationship;
(h) cryogenic fluid storage means;
(i) a third section of tubing comprising a second continuation of said inner high-pressure channel, said annular low-pressure channel and said evacuated channel of said first section of tubing and having an outer protective sheath furnishing an outermost channel for low-pressure cold fluid; said third section having a fluid delivery end inserted into said cryogenic fluid storage means;
(j) said fluid delivery end comprising
(1) Joule-Thomson valve means serving as said fluid expansion means constructed and arranged to expand and at least partially liquefy high-pressure fluid delivered thereto by said high-pressure channel,
(2) passage means constructed and arranged to return cold high-pressure gas through said annular low-pressure channel, and
(3) sealing means terminating said evacuated annular channel; and
(k) third coupling means joining said second and third sections of tubing in fluid-tight relationship and containing therein means for actuating said Joule-Thomson valve.

8. Refrigeration apparatus in accordance with claim 7 further characterized by having a second Joule-Thomson valve means within said vessel associated with said terminal heat exchanger and constructed and arranged to liquefy said fluid within said vessel.

9. Refrigeration apparatus in accordance with claim 8 including diffuser means associated with said second Joule-Thomson valve means and constructed and arranged to separate liquid and gas.

References Cited by the Examiner

UNITED STATES PATENTS

| | | | |
|---|---|---|---|
| 2,895,303 | 7/59 | Streeter | 62—9 |
| 3,018,643 | 1/62 | Evers | 62—514 |
| 3,025,680 | 3/62 | De Brosse et al. | 62—514 |
| 3,039,275 | 6/62 | Lacaze et al. | 62—45 |

OTHER REFERENCES

"Advances In Cryogenic Engineering," vol. 5, published by Plenum Press, Inc., New York (1960). Article by Nicol et al. on pages 332–337 relied on.

ROBERT A. O'LEARY, *Primary Examiner.*